(12) United States Patent
Song et al.

(10) Patent No.: US 7,814,238 B2
(45) Date of Patent: Oct. 12, 2010

(54) APPARATUS AND METHOD FOR REAL-TIME PACKET RECEPTION

(75) Inventors: Jung-Kee Song, Seongnam-si (KR); Ranjitsinh Wable, Bangalore (IN)

(73) Assignee: Samsung Electronics Co., Ltd (KR)

( * ) Notice: Subject to any disclaimer, the term of this patent is extended or adjusted under 35 U.S.C. 154(b) by 182 days.

(21) Appl. No.: 12/017,737

(22) Filed: Jan. 22, 2008

(65) Prior Publication Data

US 2008/0177818 A1   Jul. 24, 2008

(30) Foreign Application Priority Data

Jan. 22, 2007   (KR) .................... 10-2007-0006525

(51) Int. Cl.
*G06F 3/00* (2006.01)
*G06F 15/173* (2006.01)
*G06F 15/16* (2006.01)

(52) U.S. Cl. ............................. 710/14; 710/16; 710/52; 709/223; 709/232

(58) Field of Classification Search ....................... None
See application file for complete search history.

(56) References Cited

U.S. PATENT DOCUMENTS

| 6,119,161 | A | 9/2000 | Lita et al. |
| 6,286,076 | B1 | 9/2001 | Schultz |
| 2003/0163554 | A1* | 8/2003 | Sendrowicz ................ 709/220 |
| 2004/0062267 | A1* | 4/2004 | Minami et al. .............. 370/463 |

FOREIGN PATENT DOCUMENTS

| JP | 2000-236354 | 8/2000 |
| KR | 1020010058201 | 7/2001 |
| KR | 1020030036856 | 5/2003 |

OTHER PUBLICATIONS

Yongxiang Liu et al: "TCP-CM: A Transport Protocol for TCP-Friendly Transmission of Continuous Media", Conference Proceedings of the 2002 IEEE International Performance, Computing, and Communications Conference. (IPCCC). Apr. 3, 2002.

* cited by examiner

*Primary Examiner*—Alan Chen
(74) *Attorney, Agent, or Firm*—The Farrell Law Firm, LLP

(57) ABSTRACT

Provided is an apparatus and method for real-time packet reception. In a method for data reception in a socket layer with a latest packet only (LPO) function, it is determined whether an LPO mode is set. If the LPO mode is set, whether old data are present in a socket buffer is determined whenever new data are received. If the old data are present in the socket buffer, the old data are erased from the socket buffer. The received new data is stored in the socket buffer after the old data are erased.

9 Claims, 7 Drawing Sheets

APPARATUS AND METHOD FOR REAL-TIME PACKET RECEPTION

PRIORITY

This application claims priority under 35 U.S.C. §119 to an application filed in the Korean Intellectual Property Office on Jan. 22, 2007 and assigned Serial No. 2007-6525, the contents of which are incorporated herein by reference.

BACKGROUND OF THE INVENTION

1. Field of the Invention

The present invention relates generally to real-time packet reception, and in particular, to an apparatus and method for providing real-time data to an application by enabling a socket buffer to retain the latest data at all times.

2. Description of the Related Art

FIG. 1 shows a protocol stack structure for packet transmission/reception. The following description is made in the context of Internet Protocol (IP) packets.

Referring to FIG. 1, in a general IP packet transmission mechanism, a receiver receives and queues packets, which are transmitted from a transmitter, in the order of arrival irrespective of the order of transmission. The packets are processed in a TCP (Transmission Control Protocol)/UDP (User Datagram Protocol)/RAW layer 120. The processed packets are queued in a socket layer interface (SLI) 130 (i.e., a socket buffer) according to the queuing order. The queued packets are transmitted to the corresponding applications 140.

If the socket buffer is full of packets, a received packet is not queued but discarded according to a "drop-tail" policy.

FIG. 2 illustrates a process for storing data in the socket buffer.

Referring to FIG. 2, data are stored in the socket buffer according to a FIFO (First In First Out) scheme in which the first data to arrive is the first to leave.

FIG. 3 illustrates a process for loading data from the socket buffer.

Referring to FIG. 3, because the socket buffer uses a FIFO scheme as illustrated in FIG. 2, the latest data are last loaded from the socket buffer and vice versa.

The socket buffer operates well in correspondence with general applications. A security application requires real-time transmission of changed key data. However, if the security application is used together with a program that adds a large traffic load to an IP protocol stack, it is difficult to transmit the changed key data in real time.

In addition, the prior art does not address the situation where the data processing rate is much lower than the data storing rate in the socket buffer to which a large amount of data is transmitted (due to a data processing policy not a physical processing rate). In this case, loading of the latest data, which may be more necessary, is delayed because the oldest data are loaded first.

SUMMARY OF THE INVENTION

An object of the present invention is to solve at least the above problems and/or disadvantages and to provide at least the advantages below. Accordingly, an object of the present invention is to provide an apparatus and method for real-time packet reception.

Another object of the present invention is to provide an apparatus and method for enabling a socket buffer to retain the latest data at all times.

Still another object of the present invention is to provide an apparatus and method for providing real-time data to an application, which gives priority to transmission/reception of data within a predetermined period rather than buffering of all received (RX) data, by accessing the latest data from a socket buffer at all times by providing the socket buffer with a latest packet only (LPO) function.

Yet another object of the present invention is to provide an apparatus and method for increasing the data processing rate of an application, which shares a protocol stack with other programs, by accessing the latest data from a socket buffer at all times by providing the socket buffer with an LPO function.

According to one aspect of the present invention, a method for data reception in a socket layer with an LPO function includes determining if an LPO mode is set; if the LPO mode is set, determining whether old data are present in a socket buffer, whenever new data are received; if the old data are present in the socket buffer, erasing the old data from the socket buffer; and storing the received new data in the socket buffer after erasing the old data.

According to another aspect of the present invention, an apparatus for data reception in a socket layer with an LPO function includes a controller for determining whether an LPO mode is set; if the LPO mode is set, determining whether old data are present in a socket buffer, whenever new data are received; if old data are present in the socket buffer, erasing the old data from the socket buffer; and storing the new data in the socket buffer after erasing the old data.

According to still another aspect of the present invention, a system for data transmission/reception in a socket layer with an LPO function includes a transmitting node for transmitting data; and a receiving node for determining if an LPO mode is set; if the LPO mode is set, determining whether old data are present in a socket buffer, whenever new data are received; if old data are present in the socket buffer, erasing the old data from the socket buffer; and storing the new data in the socket buffer after erasing the old data.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and method for real-time packet reception.

The present invention relates to a socket option of a socket layer interface (SLI) used in a typical IP network. The SLI transmits data, which are received through an IP protocol stack, to the corresponding applications.

In order to support various applications, the SLI operates an independent socket buffer for each of the applications. In the present invention, the latest packet only (LPO) option is to operate the socket buffer in such a way that it always retains the latest data.

Figure 1:
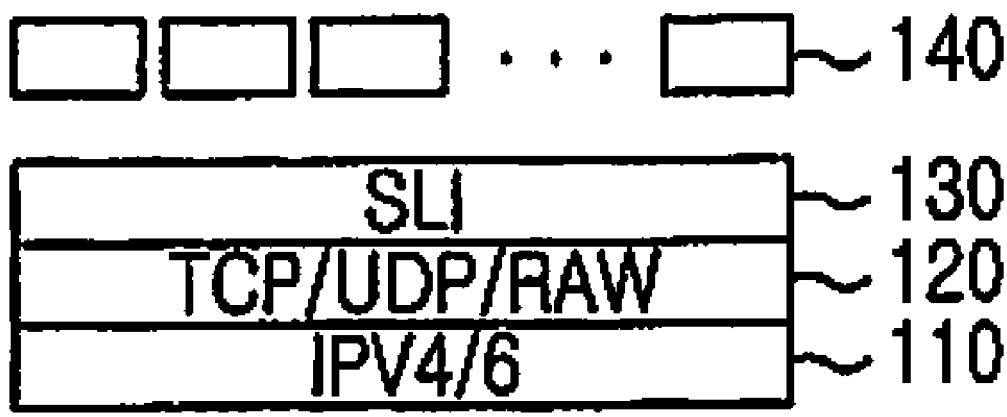
FIG. 1 is a protocol stack structure for packet transmission/reception.
Figure 2:
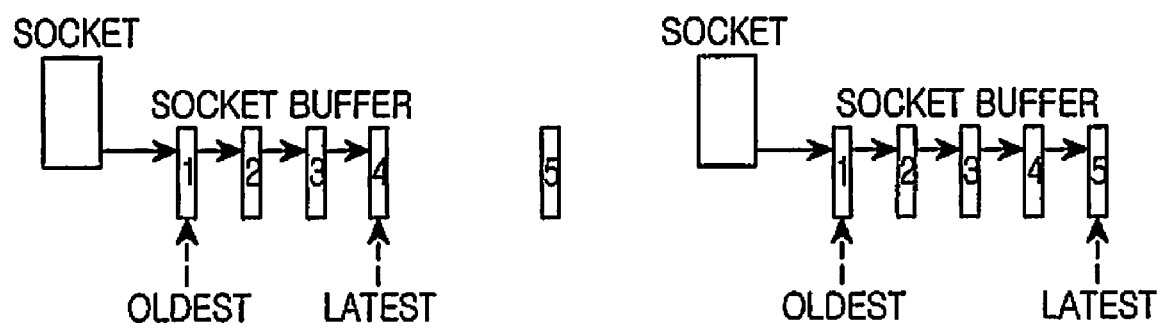
FIG. 2 is a process for storing data in a socket buffer.
Figure 3:
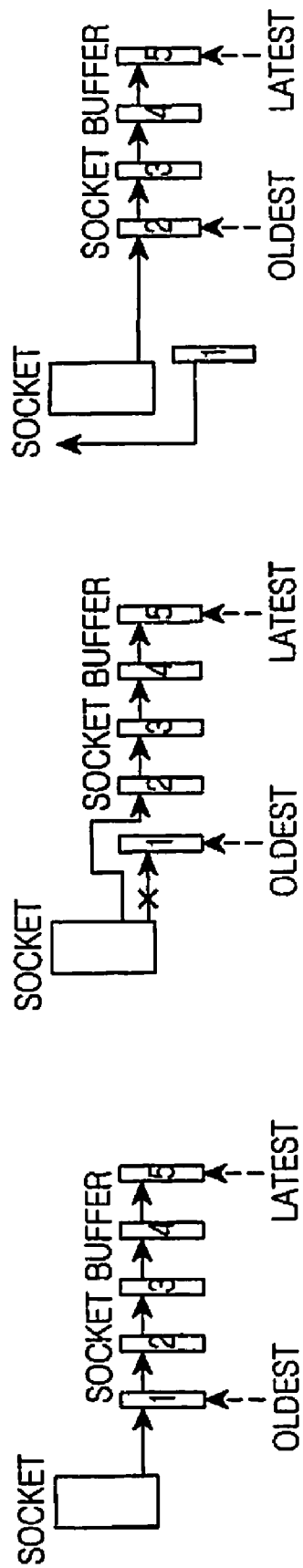
FIG. 3 is a diagram illustrating a process for loading data from the socket buffer.
Figure 4:
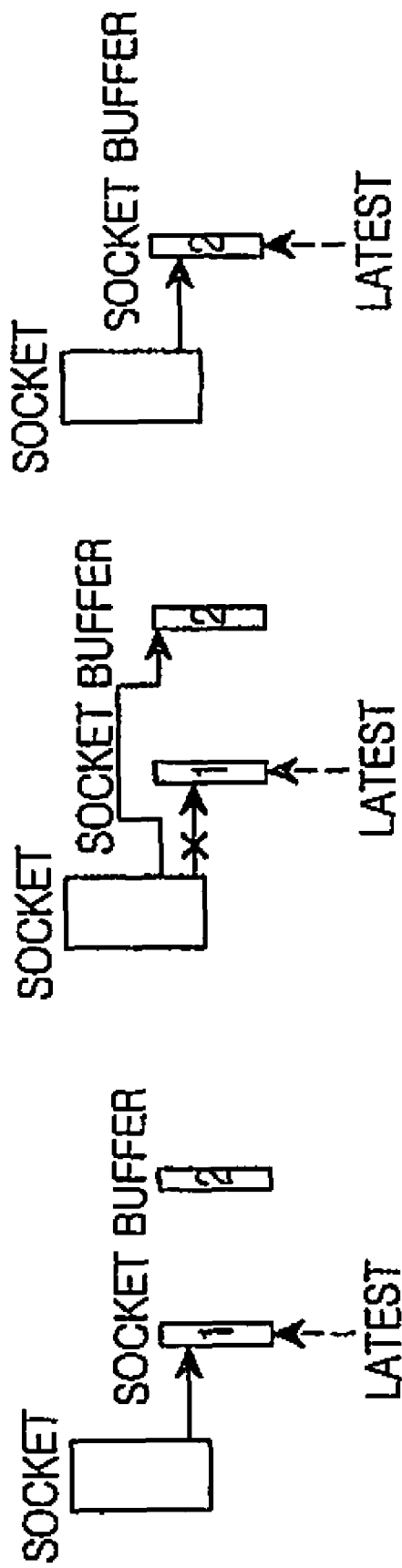
FIG. 4 is a diagram illustrating a process for storing data in a socket buffer according to an embodiment of the present invention.

Referring to FIG. 4, an LPO option is set in the socket buffer and new data arrive in the socket buffer. In this case, the old data are erased from the socket buffer and the new data are stored in the socket buffer.

Thus, the socket buffer always stores the latest data.

Figure 5:
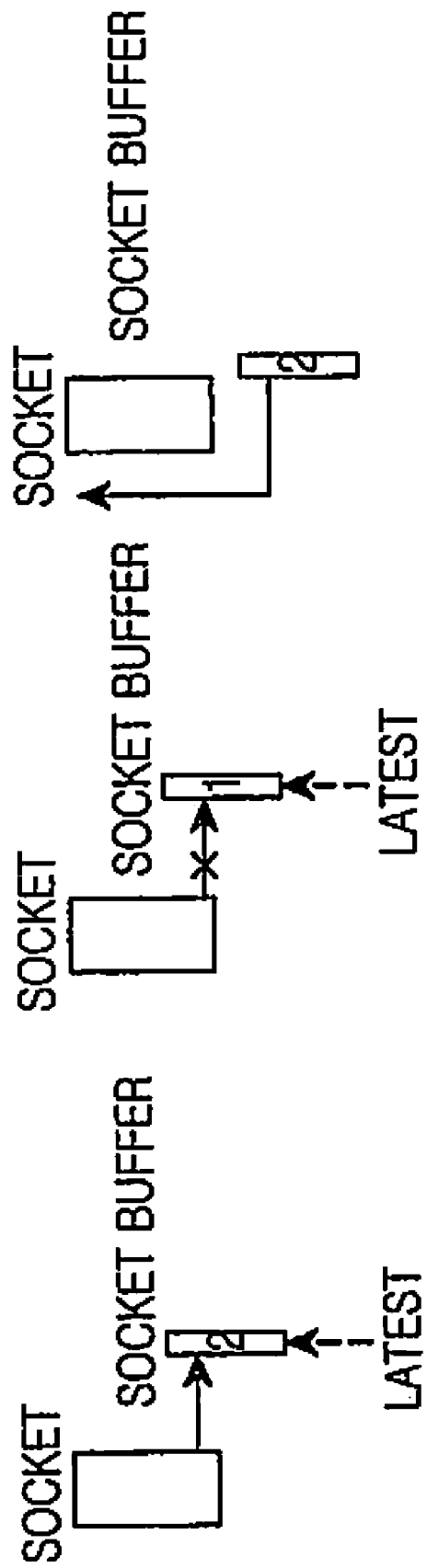
FIG. 5 is a diagram illustrating a process for loading data from the socket buffer according to an embodiment of the present invention.

Referring to FIG. 5, an LPO option is set in the socket buffer. In this case, the socket buffer is empty of data or retains only the latest data.

Thus, because the socket buffer always retains the latest data, it is possible to load the latest data from the socket buffer.

Figure 6:
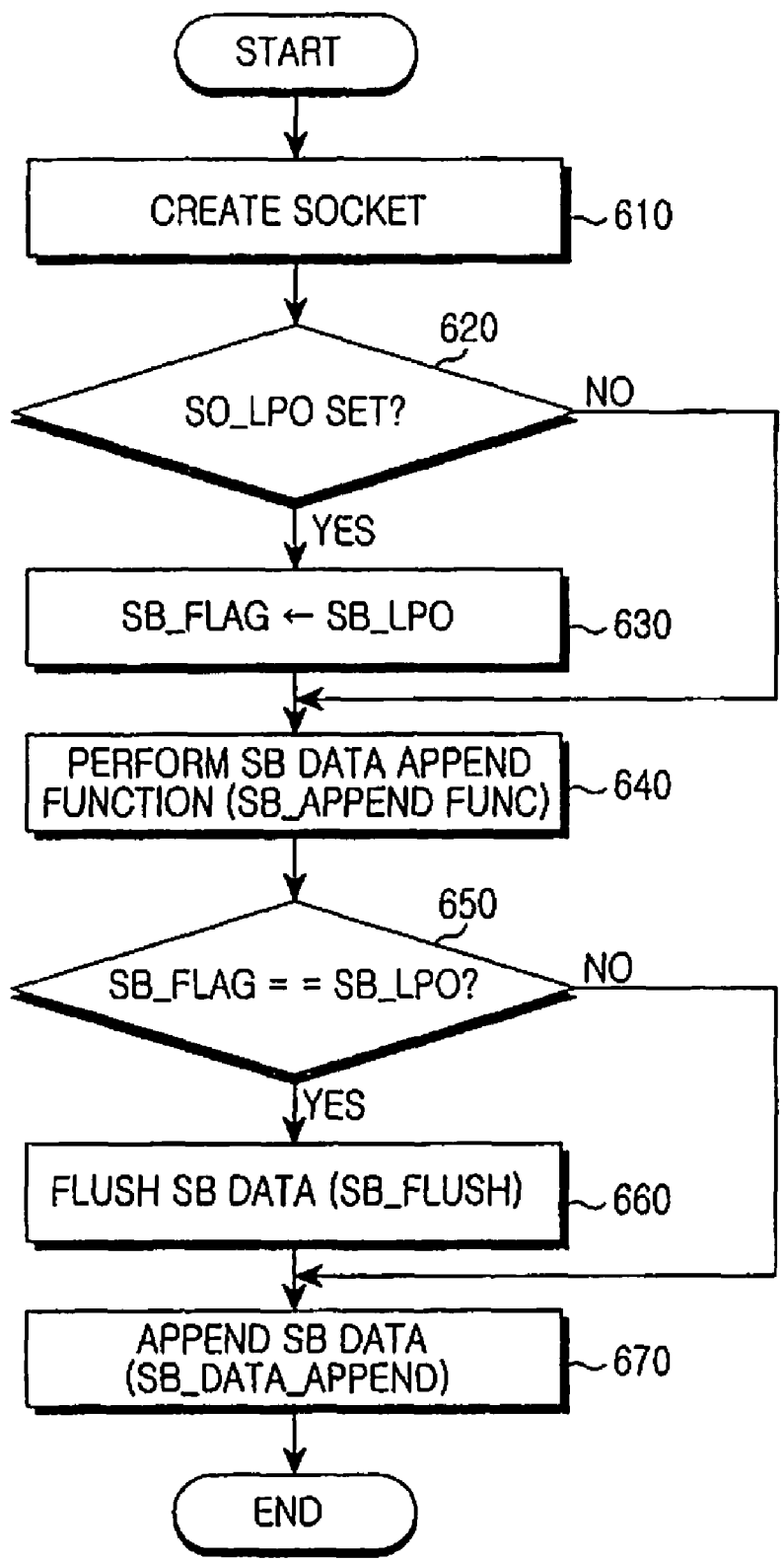
FIG. 6 is a flowchart for a procedure for storing data in the socket buffer according to an embodiment of the present invention.

Referring to FIG. 6, a socket is created in step 610. In step 620, an SLI determines if an LPO option (Socket Option_LPO(SO_LPO)) is set in the created socket. If the LPO option is set in the socket (in step 620), a flag (Socket Buffer FLAG (SB_FLAG)) is set in step 630.

In step 640, a data appending function (SB_APPEND FUNC) is performed to append data in the socket buffer. The data appending function is added to store new data that arrives in the socket buffer.

In step 650, when new data arrive in the socket buffer, the flag is checked to determine if the flag is equivalent to the LPO option (SB_FLAG==SB_LPO).

If the flag is equivalent to the LPO option in step 650, the procedure proceeds to step 660. In step 660, the old data are erased from the socket buffer. In step 670, the new data are stored in the socket buffer (SB_DATA_APPEND).

On the other hand, if the LPO option is not set in the socket in step 620, the procedure proceeds directly to step 640 to perform the data appending function (SB_APPEND FUNC) in the socket buffer. The data appending function is added to store new data that arrives in the socket buffer.

In step 650, when new data arrive in the socket buffer, the flag is checked to determine if the flag is equivalent to the LPO option (SB_FLAG==SB_LPO).

If the flag is not equivalent to the LPO option in step 650, the procedure proceeds directly to step 670. In step 670, the new data are stored next to the latest data (SB_DATA_APPEND), like the conventional art. Thereafter, the procedure ends.

Figure 7:
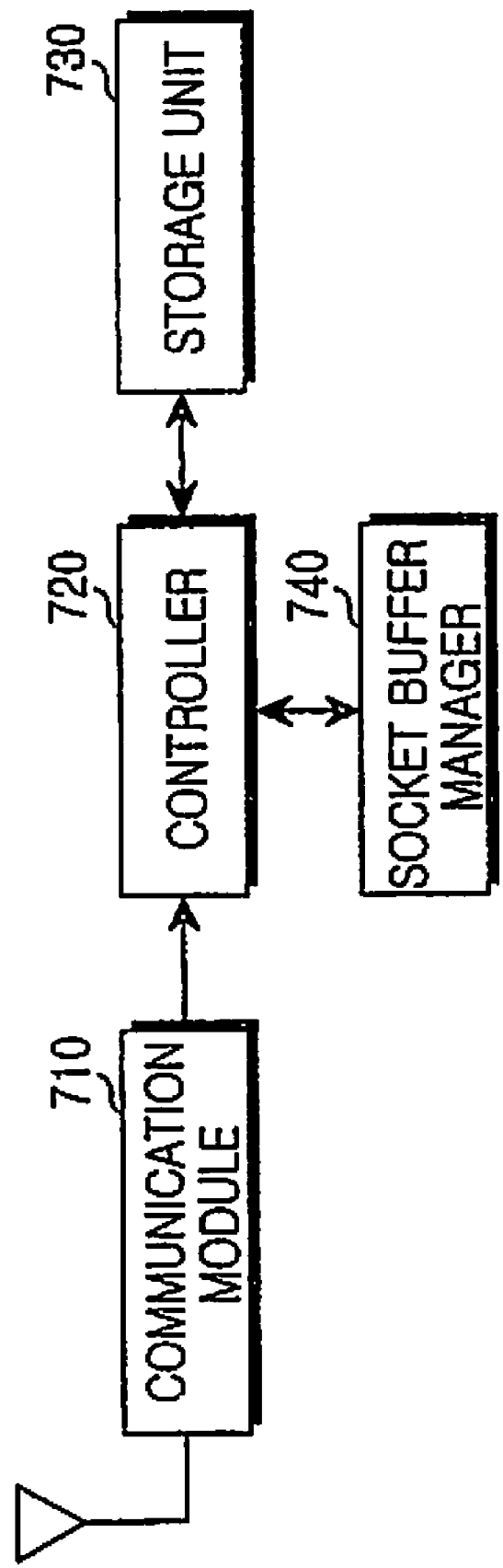
FIG. 7 is a block diagram of an apparatus for real-time packet reception according to an embodiment of the present invention.

Referring to FIG. 7, the apparatus includes a communication module 710, a controller 720, a storage unit 730, and a socket buffer manager 740.

Communication module 710 includes a wireless module, a wired module, and a baseband module. The wireless module converts a signal received through an antenna into a baseband signal, and provides the baseband signal to the baseband module. Also, the wireless module converts a baseband signal received from the baseband module into a radio-frequency (RF) signal suitable for air transmission, and transmits the RF signal through the antenna. The wired module converts a signal received through a wired channel into a baseband signal, and provides the baseband signal to the baseband module. Also, the wired module converts the baseband signal received from the baseband module into a wired signal suitable for wired transmission, and transmits the wired signal through a wired channel. Communication module 710 may include only one of the wireless and wired modules.

Controller 720 controls an overall operation of the apparatus. For example, controller 720 controls a data communication process. According to the present invention, controller 720 controls socket buffer manager 740 such that a socket buffer always retains the latest data. Also, at the request of another functional unit, controller 720 receives and provides the requested data to the functional unit.

Storage unit 730 stores a program for controlling the overall operation of the apparatus, and temporary data that are generated during the execution of programs. According to the present invention, storage unit 730 provides a memory space for the socket buffer.

Under the control of controller 720, when new data arrive in the socket buffer, socket buffer manager 740 erases the old data from the socket buffer and stores the new data in the socket buffer such that the socket buffer always retains the latest data. Also, at the request of controller 730, socket buffer manager 740 provides controller 730 with the latest data stored in the socket buffer.

Although socket buffer manager 740 is provided separately, controller 720 may perform some or all of the functions of socket buffer manager 740 instead of socket buffer manager 740.

As described above, the present invention enables the socket buffer to store only the latest data, thereby making it possible to transmit data within a predetermined period and to increase the memory use efficiency. Also, the present invention can reduce the load for processing the old data, thereby making it possible to increase the system performance and to reduce the system complexity. In particular, the present invention can satisfy the requirements for an application requiring real-time key transmission.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for data reception in a socket layer with a latest packet only (LPO) function, the method comprising:
   determining whether an LPO mode is set;
   determining, when the LPO mode is set, whether old data is present in a socket buffer, whenever new data is received;

erasing, when the old data is present in the socket buffer, the old data from the socket buffer; and storing the received new data in the socket buffer after erasing the old data.

2. The method of claim 1, further comprising storing the received new data next to the latest data in the socket buffer when the LPO mode is not set.

3. The method of claim 1, further comprising providing the stored new data to a functional module upon receiving a request from the functional module.

4. An apparatus for data reception in a socket layer with a latest packet only (LPO) function, the apparatus comprising:

a controller for determining whether an LPO mode is set; when the LPO mode is set, determining whether old data is present in a socket buffer, whenever new data is received; when old data is present in the socket buffer, erasing the old data from the socket buffer; and storing the new data in the socket buffer after erasing the old data.

5. The apparatus of claim 4, wherein the controller stores the received new data next to the latest data in the socket buffer if an LPO mode is not set.

6. The apparatus of claim 4, wherein the controller provides the stored new data to a functional module upon receiving a request from the functional module.

7. A system for data transmission/reception in a socket layer with a latest packet only (LPO) function, the system comprising:

a transmitting node for transmitting data; and a receiving node for determining whether an LPO mode is set; when the LPO mode is set, determining whether old data is present in a socket buffer, whenever new data is received; when old data is present in the socket buffer, erasing the old data from the socket buffer; and storing the new data in the socket buffer after erasing the old data.

8. The system of claim 7, wherein the receiving node stores the received new data next to the latest data in the socket buffer if an LPO mode is not set.

9. The system of claim 7, wherein the receiving node provides the stored new data at the request of a functional module therein.

* * * * *